US010652195B2

(12) United States Patent
Rust, III et al.

(10) Patent No.: US 10,652,195 B2
(45) Date of Patent: May 12, 2020

(54) SYSTEMS, COMPUTING DEVICES, AND METHODS FOR FACILITATING COMMUNICATION TO MULTIPLE CONTACTS VIA MULTIPLE, DIFFERENT COMMUNICATION MODALITIES

(71) Applicant: CrowdReach, LLC, Charleston, SC (US)

(72) Inventors: Carl King Rust, III, Mt. Pleasant, SC (US); Arun Bose, Charleston, SC (US)

(73) Assignee: CrowdReach, LLC, Charleston, SC (US)

(*) Notice: Subject to any disclaimer, the term of this patent is extended or adjusted under 35 U.S.C. 154(b) by 214 days.

(21) Appl. No.: 15/268,492

(22) Filed: Sep. 16, 2016

(65) Prior Publication Data

US 2017/0078236 A1    Mar. 16, 2017

Related U.S. Application Data

(60) Provisional application No. 62/219,281, filed on Sep. 16, 2015.

(51) Int. Cl.
*G06F 3/0482*    (2013.01)
*H04L 12/58*    (2006.01)
(Continued)

(52) U.S. Cl.
CPC ............ *H04L 51/28* (2013.01); *G06F 3/0481* (2013.01); *G06F 3/0482* (2013.01);
(Continued)

(58) Field of Classification Search
CPC .... G06F 15/16; G06F 3/04812; G06F 3/0484; G06F 3/0488; G06F 3/14; G06F 3/0482;
(Continued)

(56) References Cited

U.S. PATENT DOCUMENTS 6,430,177 B1    8/2002 Luzeski et al.
6,442,589 B1    8/2002 Takahashi et al.
(Continued)

FOREIGN PATENT DOCUMENTS

WO    03021900 A1    3/2003
WO    2010012988 A1    2/2010
(Continued)

OTHER PUBLICATIONS

International Preliminary Report on Patentability and Written Opinion issued in PCT Application No. PCT/US2016/052354 dated Mar. 20, 2018 (four (4) pages).

(Continued)

*Primary Examiner* — Steven P Sax
(74) *Attorney, Agent, or Firm* — Olive Law Group, PLLC

(57) ABSTRACT

Systems, computing devices, and methods for communicating to multiple contacts via multiple, different communication modalities are disclosed herein. According to an aspect, a computing device includes a user interface configured to present a plurality of contacts for communication via multiple, different communication modalities. The user interface can also receive user selection of two or more of the contacts for communication. The computing device can also include a communications manager configured to initiate communication with the two or more of the contacts via two of the modalities in response to receipt of the user selection of the contacts.

19 Claims, 18 Drawing Sheets

(51) Int. Cl.
*H04L 29/08* (2006.01)
*G06F 3/0481* (2013.01)
*H04W 4/14* (2009.01)

(52) U.S. Cl.
CPC ............ *H04L 67/306* (2013.01); *H04L 51/22* (2013.01); *H04L 51/32* (2013.01); *H04L 67/02* (2013.01); *H04W 4/14* (2013.01)

(58) Field of Classification Search
CPC ......... H04L 51/32; H04L 51/28; H04L 51/22; H04L 67/306; H04L 67/02; H04W 4/14
See application file for complete search history.

(56) References Cited

U.S. PATENT DOCUMENTS

| | | | |
|---|---|---|---|
| 6,999,565 B1 | 2/2006 | Delaney et al. | |
| 7,024,209 B1 | 4/2006 | Gress et al. | |
| 7,035,383 B2 | 4/2006 | O'Neal | |
| 7,117,445 B2 | 10/2006 | Berger | |
| 7,251,252 B2 | 7/2007 | Norby et al. | |
| 7,269,432 B2 | 9/2007 | Gress et al. | |
| 7,464,141 B2 | 12/2008 | Morris | |
| 7,587,482 B2 | 9/2009 | Henderson et al. | |
| 7,756,256 B1 | 7/2010 | Rukman et al. | |
| 7,844,906 B2 | 11/2010 | Berger | |
| 8,130,917 B2 | 3/2012 | Helbling et al. | |
| 8,244,851 B1* | 8/2012 | Postoaca | G06Q 50/01 709/205 |
| 8,265,664 B1 | 9/2012 | Cenciarelli et al. | |
| 8,391,450 B2 | 3/2013 | Rukman et al. | |
| 8,407,294 B2 | 3/2013 | Dobrill et al. | |
| 8,489,130 B2 | 7/2013 | Shaw | |
| 8,532,637 B2 | 9/2013 | Abolrous et al. | |
| 8,644,462 B2 | 2/2014 | Rukman et al. | |
| 8,694,031 B2 | 4/2014 | Lew et al. | |
| 8,706,824 B2 | 4/2014 | Davenport et al. | |
| 8,793,311 B2 | 7/2014 | Watanabe et al. | |
| 8,866,868 B2 | 10/2014 | Norby | |
| 8,880,627 B2 | 11/2014 | Davenport et al. | |
| 8,886,243 B1 | 11/2014 | Pabla et al. | |
| 8,918,085 B2 | 12/2014 | Let et al. | |
| 8,942,358 B2 | 1/2015 | Rukman et al. | |
| 9,049,166 B2 | 6/2015 | Shaw | |
| 9,124,692 B2 | 9/2015 | Bhargava | |
| 9,349,118 B2* | 5/2016 | Chavez | G06Q 10/101 |
| 10,216,709 B2* | 2/2019 | Lane | G06F 17/212 |
| 2003/0083924 A1* | 5/2003 | Lee | G06Q 30/02 705/7.33 |
| 2003/0142797 A1 | 7/2003 | Troy et al. | |
| 2003/0142809 A1* | 7/2003 | Coffey | H04M 3/5158 379/265.01 |
| 2003/0144873 A1* | 7/2003 | Keshel | G06Q 30/02 705/1.1 |
| 2003/0163536 A1 | 8/2003 | Pettine, Jr. | |
| 2003/0171942 A1* | 9/2003 | Gaito | G06Q 10/10 705/1.1 |
| 2004/0267887 A1 | 12/2004 | Berger et al. | |
| 2005/0125737 A1* | 6/2005 | Allen | G06Q 10/0637 715/758 |
| 2005/0216550 A1 | 9/2005 | Paseman et al. | |
| 2007/0203977 A1* | 8/2007 | Wu | H04L 51/04 709/203 |
| 2007/0265873 A1 | 11/2007 | Sheth et al. | |
| 2009/0028183 A1 | 1/2009 | Landers et al. | |
| 2009/0028306 A1 | 1/2009 | Rhie | |
| 2009/0103521 A1* | 4/2009 | Katis | H04L 51/04 370/352 |
| 2009/0181702 A1 | 7/2009 | Vargas et al. | |
| 2009/0299802 A1* | 12/2009 | Brennan | G06Q 10/06 705/7.36 |
| 2010/0125791 A1* | 5/2010 | Katis | H04M 3/42221 715/716 |
| 2010/0250592 A1 | 9/2010 | Paquet et al. | |
| 2010/0269049 A1* | 10/2010 | Fearon | G06Q 10/109 715/744 |
| 2010/0293108 A1* | 11/2010 | Gurvitch | G06Q 40/04 705/36 R |
| 2010/0324961 A1 | 12/2010 | Singh et al. | |
| 2011/0035681 A1 | 2/2011 | Mandel et al. | |
| 2011/0047246 A1* | 2/2011 | Frissora | G06F 9/543 709/219 |
| 2011/0179126 A1 | 7/2011 | Wetherell et al. | |
| 2012/0023417 A1* | 1/2012 | Nesladek | G01C 21/265 715/753 |
| 2012/0084188 A1* | 4/2012 | Zuber | G06Q 10/10 705/34 |
| 2012/0124146 A1 | 5/2012 | Hsiao et al. | |
| 2012/0124483 A1 | 5/2012 | Zuckerberg et al. | |
| 2012/0166568 A1 | 6/2012 | Helbling et al. | |
| 2012/0204113 A1* | 8/2012 | Shiplacoff | G06F 3/0482 715/733 |
| 2012/0221372 A1* | 8/2012 | Vasko | G06Q 10/06 705/7.26 |
| 2012/0226759 A1 | 9/2012 | Lew et al. | |
| 2013/0014021 A1* | 1/2013 | Bau | G06Q 10/107 715/739 |
| 2013/0066677 A1* | 3/2013 | Killoh | G06Q 30/0276 705/7.29 |
| 2013/0111356 A1 | 5/2013 | Vasudevan et al. | |
| 2013/0138752 A1 | 5/2013 | Guthrie et al. | |
| 2013/0144950 A1 | 6/2013 | Sanakaranarasimhan et al. | |
| 2013/0191462 A1* | 7/2013 | Hartzler | G06Q 30/02 709/206 |
| 2013/0196697 A1 | 8/2013 | Lew et al. | |
| 2013/0204888 A1 | 8/2013 | Guzman Suarez et al. | |
| 2013/0226710 A1* | 8/2013 | Plut | G06Q 30/02 705/14.67 |
| 2013/0310089 A1 | 11/2013 | Gianoukos et al. | |
| 2013/0325572 A1* | 12/2013 | Plut | G06Q 30/0241 705/14.16 |
| 2014/0108566 A1 | 4/2014 | Vanscoyk et al. | |
| 2014/0109046 A1* | 4/2014 | Hirsch | G06F 9/44 717/120 |
| 2014/0123025 A1* | 5/2014 | Bau | H04L 51/04 715/752 |
| 2014/0258503 A1 | 9/2014 | Tong et al. | |
| 2014/0289249 A1 | 9/2014 | Davis et al. | |
| 2015/0006237 A1* | 1/2015 | Beck | G06Q 10/0635 705/7.27 |
| 2015/0057037 A1 | 2/2015 | Rukman et al. | |
| 2015/0058324 A1* | 2/2015 | Kauwe | G06F 16/24575 707/722 |
| 2015/0127565 A1* | 5/2015 | Chevalier | G06Q 10/00 705/319 |
| 2015/0170209 A1* | 6/2015 | Smith | G06Q 30/02 705/14.64 |
| 2015/0186478 A1* | 7/2015 | Yan | G06F 16/14 707/722 |
| 2015/0193792 A1 | 7/2015 | Magdon-Ismail | |
| 2015/0256492 A1* | 9/2015 | Xie | H04L 51/046 709/206 |
| 2016/0321757 A1* | 11/2016 | Hegarty | G06Q 40/08 |

FOREIGN PATENT DOCUMENTS

| | | |
|---|---|---|
| WO | 2012131688 A2 | 10/2012 |
| WO | 2012137215 A1 | 10/2012 |

OTHER PUBLICATIONS

International Search Report and Written Opinion for PCT/US2016/052354 dated Jan. 26, 2017.

Victoria Beltran, Emmanuel Bertin, Science Direct: Computer Communications, www.elsevier.com/locate/comcom, Unified Communications as a Service and Webrtc: An Identity-Centric Perspective, pp. 1-10, Jul. 25, 2015.

* cited by examiner

FIG. 12

Update Your Preferences                                                                 Unsubscribe Powered by
CROWDREACH

FIG. 15

SYSTEMS, COMPUTING DEVICES, AND METHODS FOR FACILITATING COMMUNICATION TO MULTIPLE CONTACTS VIA MULTIPLE, DIFFERENT COMMUNICATION MODALITIES

CROSS REFERENCE TO RELATED APPLICATION

This application claims priority to U.S. Provisional Patent Application No. 62/219,281, filed Sep. 16, 2015, the entire disclosure of which is incorporated herein by reference in its entirety.

TECHNICAL FIELD

The presently disclosed subject matter relates to communications. More particularly, the presently disclosed subject matter relates to facilitation of communication to multiple contacts via multiple, different communication modalities.

BACKGROUND

Communication among people by use of computing devices has become ubiquitous. Smartphones, desktop computers, tablet computers, and laptop computers are commonly used for communication among individuals in a wide variety of modalities, such as email, text messaging, and various social network communication modalities. Communications can include text and data such as photos, video, work files, and the like.

Computing devices typically have functionality and tools for managing communications such as contact management software, web browsers, and application (commonly known as an "app"). Contact management can involve maintaining names of individuals and information for communicating with the others and for facilitating such communication. Contact lists can be used for business and personal reasons. As people have become more connected by their computing devices, it has become more of a need to provide improved and convenient tools for facilitating communication.

SUMMARY

Disclosed herein are systems, computing devices, and methods for communicating to multiple contacts via multiple, different communication modalities. According to an aspect, a computing device includes a user interface configured to present a plurality of contacts for communication via multiple, different communication modalities. The user interface can also receive user selection of two or more of the contacts for communication. The computing device can also include a communications manager configured to initiate communication with the two or more of the contacts via two of the modalities in response to receipt of the user selection of the contacts.

BRIEF DESCRIPTION OF THE DRAWINGS

The foregoing summary, as well as the following detailed description of various embodiments, is better understood when read in conjunction with the drawings provided herein. For the purposes of illustration, there is shown in the drawings exemplary embodiments; however, the presently disclosed subject matter is not limited to the specific methods and instrumentalities disclosed.

FIG. 12 illustrates a screen display of another example interface for importing contacts from CSV in accordance with embodiments of the present disclosure;

FIG. 15 illustrates a screen display of an example interface for setting communication preferences and for unsubscribing in accordance with embodiments of the present disclosure;

DETAILED DESCRIPTION

Figure 1:
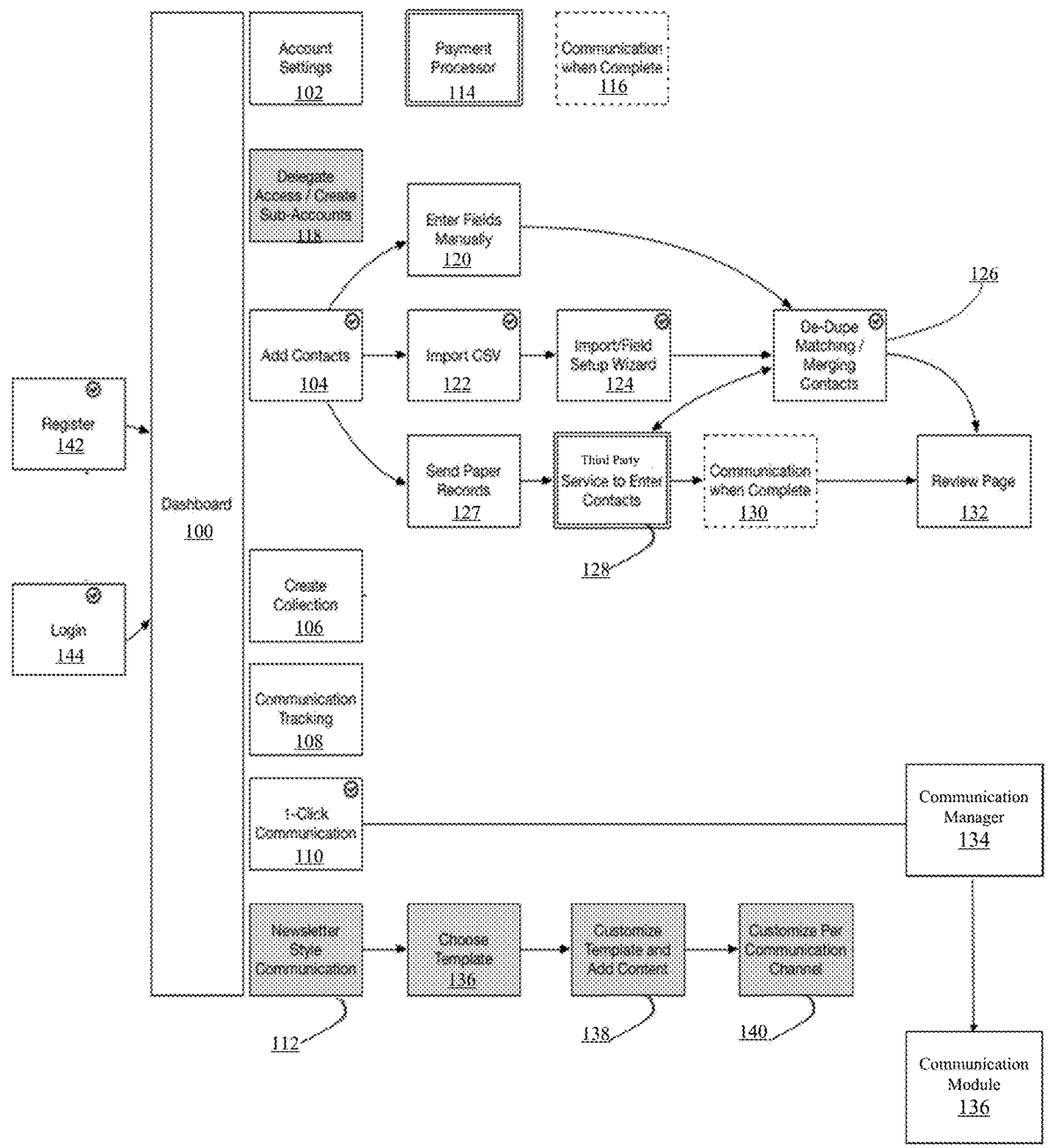
FIG. 1 is a block diagram of an example system for communicating to multiple contacts via multiple, different communication modalities in accordance with embodiments of the present disclosure.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Articles "a" and "an" are used herein to refer to one or to more than one (i.e. at least one) of the grammatical object of the article. By way of example, "an element" means at least one element and can include more than one element.

In this disclosure, "comprises," "comprising," "containing" and "having" and the like can have the meaning ascribed to them in U.S. Patent law and can mean "includes," "including," and the like "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Unless otherwise defined, all technical terms used herein have the same meaning as commonly understood by one of ordinary skill in the art to which this disclosure belongs.

In accordance with embodiments, systems, computing devices, and methods are disclosed for communicating to multiple contacts via multiple, different communication modalities. According to an aspect, a computing device includes a user interface configured to present a plurality of contacts for communication via multiple, different communication modalities. The user interface can also receive user selection of two or more of the contacts for communication. The computing device can also include a communications manager configured to initiate communication with the two or more of the contacts via two of the modalities in response to receipt of the user selection of the contacts.

As referred to herein, the term "computing device" should be broadly construed. It can include any type of mobile device, for example, a smart phone, a cell phone, a pager, a personal digital assistant (PDA, e.g., with GPRS NIC), a mobile computer with a smart phone client, or the like. A computing device can also include any type of conventional computer, for example, a desktop computer or a laptop computer. A typical mobile device is a wireless data access-enabled device (e.g., an iPHONE® smart phone, a BLACK-BERRY® smart phone, a NEXUS ONE™ smart phone, an iPAD™ device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

As referred to herein, a "user interface" is generally a system by which users interact with a computing device. A user interface can include an input for allowing users to manipulate a computing device, and can include an output for allowing the system to present information and/or data, indicate the effects of the user's manipulation, etc. An example of an interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, a user interface can be a display window or display object, which is selectable by a user of a mobile device for interaction. The display object can be displayed on a display screen of a mobile device and can be selected by, and interacted with by, a user using the interface. In an example, the display of the mobile device can be a touch screen, which can display the display icon. The user can depress the area of the display screen at which the display icon is displayed for selecting the display icon. In another example, the user can use any other suitable user interface of a mobile device, such as a keypad, to select the display icon or display object. For example, the user can use a track ball or arrow keys for moving a cursor to highlight and select the display object.

Operating environments in which embodiments of the presently disclosed subject matter may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or the proposed 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the presently disclosed subject matter may be implemented in other and next-generation mobile networks and devices as well. The mobile device is the physical equipment used by the end user, typically a subscriber to the wireless network. Typically, a mobile device is a 2.5G-compliant device or 3G-compliant device (or the proposed 4G-compliant device) that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The mobile device may also include a memory or data store.

As referred to herein, the term "contact" can refer to a screen name or user name of an individual who can be communicated with via a computing device. A contact may be a part of multiple other contacts in a contact list as will be understood by those of skill in the art. Contact lists are used in computing device communications functions such as text messaging, emailing, and social network messaging. To communicate with someone one the contact list, a user may select a name and act upon it. For example, a text messaging client can allow someone to select a contact and enter text and/or other data for communication to the selected contact.

As referred to herein, the term "communication modality" refers to any suitable process or technique for communication between individuals operating computing devices. Example communication modalities include, but are not limited to, email, text messaging, social network messaging, and the like.

The presently disclosed subject matter is now described in more detail. For example, FIG. 1 illustrates a block diagram of an example system for communicating to multiple contacts via multiple, different communication modalities in accordance with embodiments of the present disclosure. It should be appreciated that FIG. 1 provided only one example system and that any other suitable system may implement the functions described for the system of FIG. 1. The system provides an automated communications management platform with which subscribers or users can consolidate contact data and facilitate communications through a single application.

The system shown in FIG. 1 may be utilized by an individual user, for-profit business, or non-profit business for communicating with others by use of a selected communication modality. Particularly, a user may use the system as a contact manager for planning and coordinating communication with others, such as business customers. The system can also be utilized for allowing users to import contacts into the system database for use in communicating, such as via email, text messaging, social network messaging, and the like. Further, the system can utilize a "1-click" technique for sending communications via multiple, different communication modalities to multiple different contacts. Communication preferences for each contact may be set as will be described herein in more detail.

Now referring to FIG. 1, the block diagram provides an overview of example functionality in web-based and mobile applications. The system may include a dashboard 100 for interaction with a user or subscriber. The dashboard 100 is a particular user interface with which the user may interface. It should be understood that any other suitable user interface may be used. The user may use the dashboard 100 for managing account settings 102, adding contacts 104, creating a subscriber or user collection 106, tracking communications 108, initiating "one click" communication 110, and generating a particular communication format 112. Various account settings may be added, edited, or deleted as will be understood. Contacts may be suitably added via user interaction with the dashboard 100. Communications may be tracked by providing to the user a history of communications with others. Various communications, such as a "one click" communication, may be generated and initiated via the dashboard as described in further detail herein. Further, the dashboard 100 may be used for generating particular communication formats for communication with others.

Account settings 102 may involve use of a payment processor 114 for processing payments. A communication 116 may notify the user when the payment processing is complete. Further, access may be delegated and sub-accounts created 118 by use of the dashboard.

Contacts may be added via any suitable technique. In an example, contacts may be added by manually entering data 120 into fields for the contact. In another example, a contact file may be imported 122 such as by importing data from a comma-separated value (CSV) file. An import/field setup wizard 124 may be used for importing the contact file. Subsequently, duplicates may be removed and contact merged 126 from the set of manually entered contacts and the imported contact file. These contacts may be received in paper format 127 and entered into the system 128 by a third party service provider, and the user notified upon completion 130. Subsequently, a review page 132 may be presented to the user via the dashboard for review.

At block 106, additional subscribers may be suitably added to a collection of sub scribers.

At block 110, a user may be presented by the dashboard 100 with multiple contacts for communication via multiple, different communication modalities. Subsequently, a user may enter into the dashboard 100 selection of two or more contacts for communication. A communications manager 134 may be configured to initiate communication with the contact(s) via two or more communication modalities in response to receipt of the user selection of the contact(s). Subsequently, a communications module 136 may communicate a message and/or data to the contact(s) via the communication modalities. The communications module 136 may be, for example, a network interface configured to interface with a network (e.g., the Internet) for communicating via the communication modalities.

The communications manager 134 may be implemented by hardware, software, firmware, or combinations thereof. For example, the communications manager 134 may be implemented by one or more processors and memory. The communications manager 134 may include functionality for controlling the dashboard 100 or user interface for implementing the functions of the user interface described herein.

In accordance with embodiments, the dashboard 100 or other type of user interface may present the different modalities for selection as a preferred modality for communicating with the contact. This may be presented to a user via a display. Further, the communications manager 134 may initiate communication with each of the contacts via the preferred communication modality for the contact in response to receipt of the user selection of the at least two of the contacts.

In accordance with embodiments, the dashboard 100 or other type of user interface may display a single displayed component for interaction for selection of the at least two of the contacts for communication. In an example, the single displayed component may be a displayed button for interaction by the user for "one click" initiation of the communication without further input. Further, the communications manager 134 may be configured to initiate communication with the contacts via the preferred modality of each of the contacts in response to interaction with the single displayed component.

In accordance with embodiments, the dashboard 100 or other type of user interface can receive user selection of one or both of a template and content for communication via each communication modality. In an example, a user may choose a template 138, customize the template and add content 140, and customize per communication channel or modality 142.

With continuing reference to FIG. 1, the system may include registration 142 and login 144 functionalities. For registration 142, a user may register with the system as will be understood by those of skill in the art. Subsequently, the user may login with the login function 144 by entry of a username and password, for example.

Figure 2:
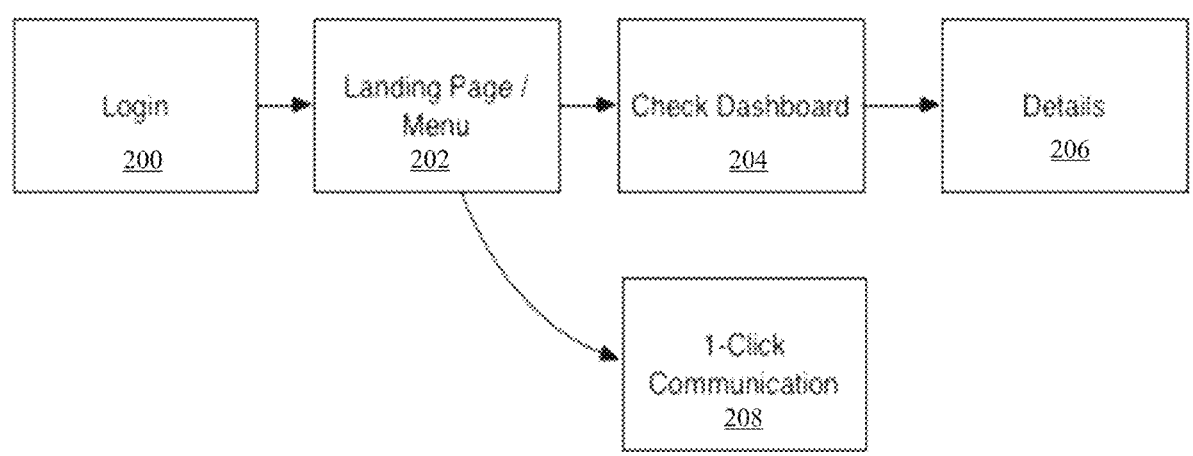
FIG. 2 is a flow diagram of an example interface with a user (or subscriber) mobile application ("app") in accordance with embodiments of the present disclosure.

FIG. 2 illustrates a flow diagram of an example interface with a user (or subscriber) mobile application ("app") in accordance with embodiments of the present disclosure. Functionality of the interface may be implemented via any suitable computing device. Referring to FIG. 2, a user may login 200 and subsequently be presented with a landing page or menu 202 via a user interface such as a display. A user may then select to check his or her dashboard 204 and be presented with details of his or her account 206. Also, at the menu, the user may select to initiate "one click" communication 208 as described herein.

Figure 3:
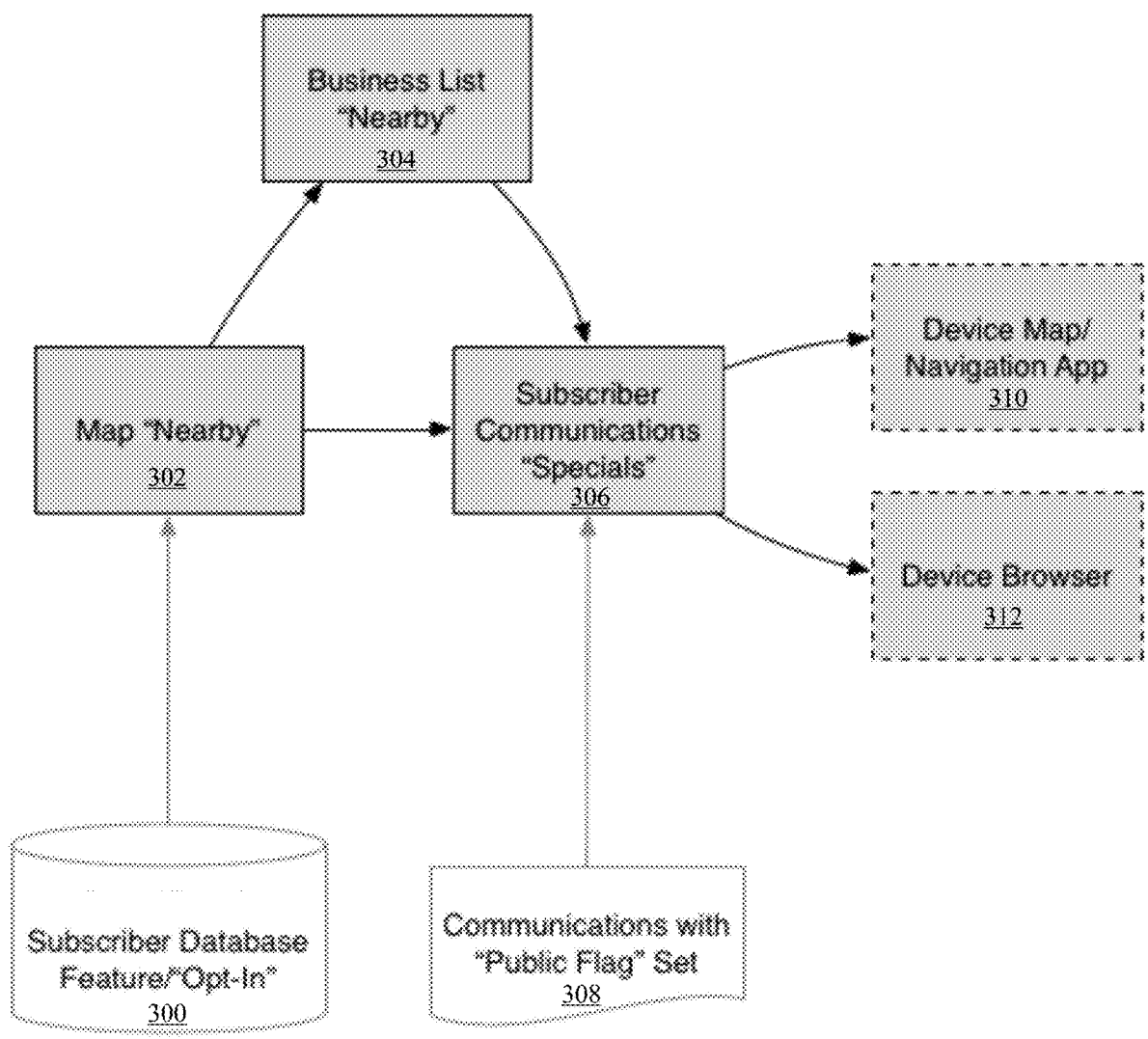
FIG. 3 is a flow diagram of an example interface of a consumer mobile app in accordance with embodiments of the present disclosure.

FIG. 3 illustrates a flow diagram of an example interface of a consumer mobile app in accordance with embodiments of the present disclosure. Functionality of the interface may be implemented via any suitable computing device. Referring to FIG. 3, a subscriber database 300 of features and "opt-in" information may be provided. A map function 302 may determine nearby subscribers based on information of the subscriber database 300. In addition, a list 304 of nearby businesses may be provided to a subscriber communication function 306 that receives communications having a "public flag" setting 308. Such communications may be sent to device map/navigations apps 310 and to device browsers 312.

Figure 4:
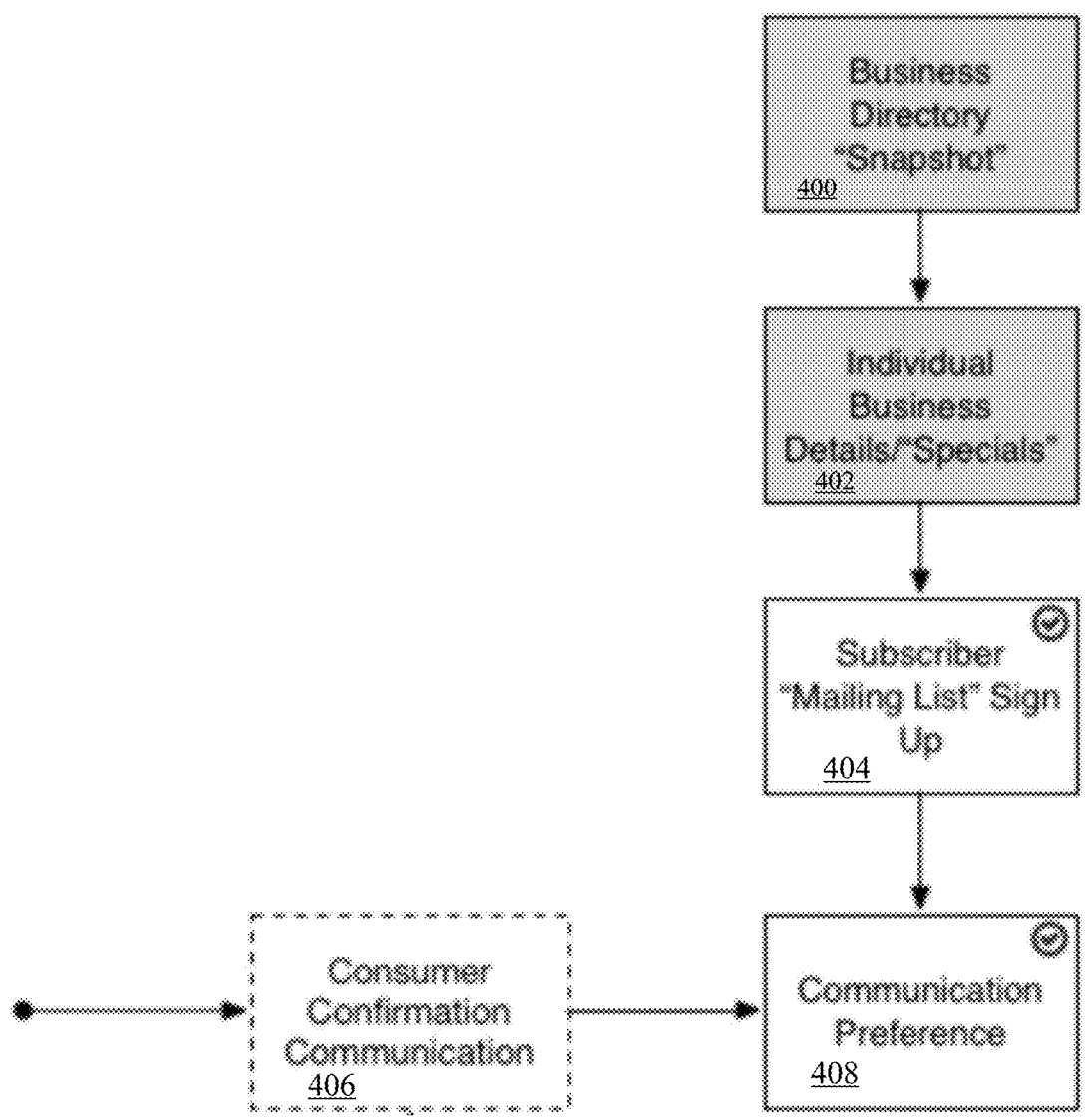
FIG. 4 is a flow diagram of an example interface of a consumer website in accordance with embodiments of the present disclosure.

FIG. 4 illustrates a flow diagram of an example interface of a consumer website in accordance with embodiments of the present disclosure. Functionality of the interface may be implemented via any suitable computing device. Referring to FIG. 4, the website can provide business directory "snapshot" information 400, individual business details or specials information 402, and subscriber mailing list sign up functionality 404. A consumer confirmation communication 406 may be received and provided with a communication preference 408.

Figure 5:
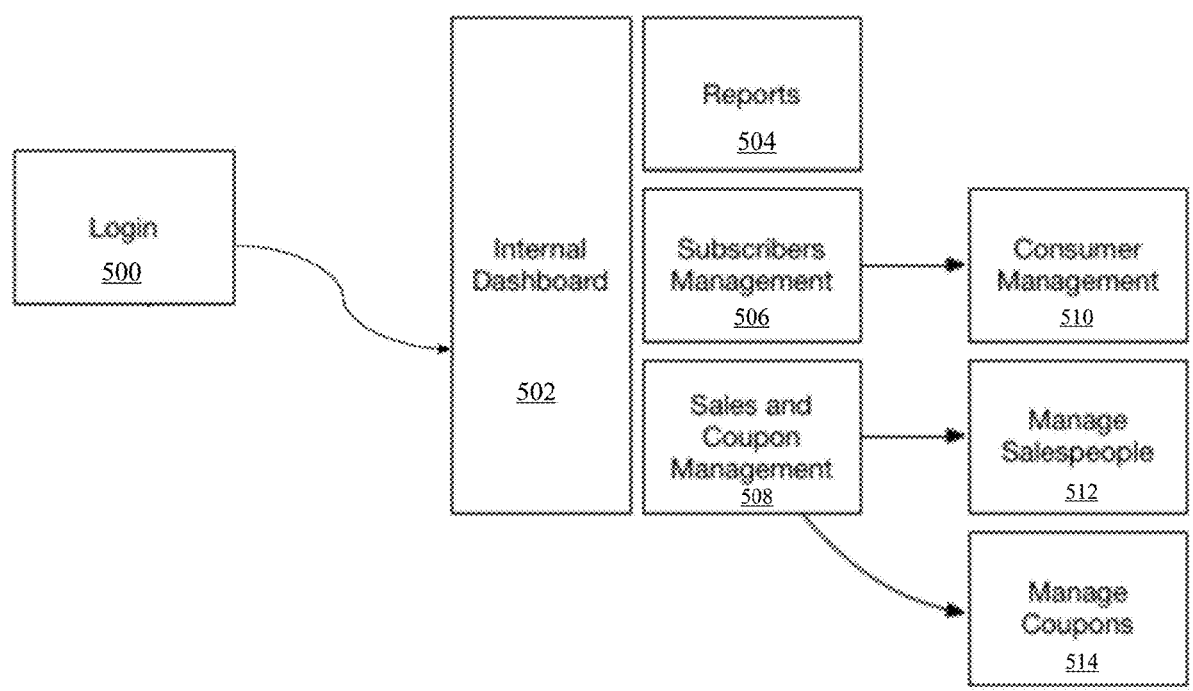
FIG. 5 is a flow diagram of an example interface of an administrator website in accordance with embodiments of the present disclosure.

FIG. 5 illustrates a flow diagram of an example interface of an administrator website in accordance with embodiments of the present disclosure. Functionality of the interface may be implemented via any suitable computing device. Referring to FIG. 5, the website can provide a login functionality 500 and an internal dashboard 502. An administrator may use the dashboard 502 for viewing and interacting with reports 504. Further, the dashboard 502 may be used for subscribers management 506 including consumer manager 510. The dashboard may also be used for sales and coupon management 508. The sales and coupon management functions may include salespeople manager 512 and coupon management 514.

Figure 6:
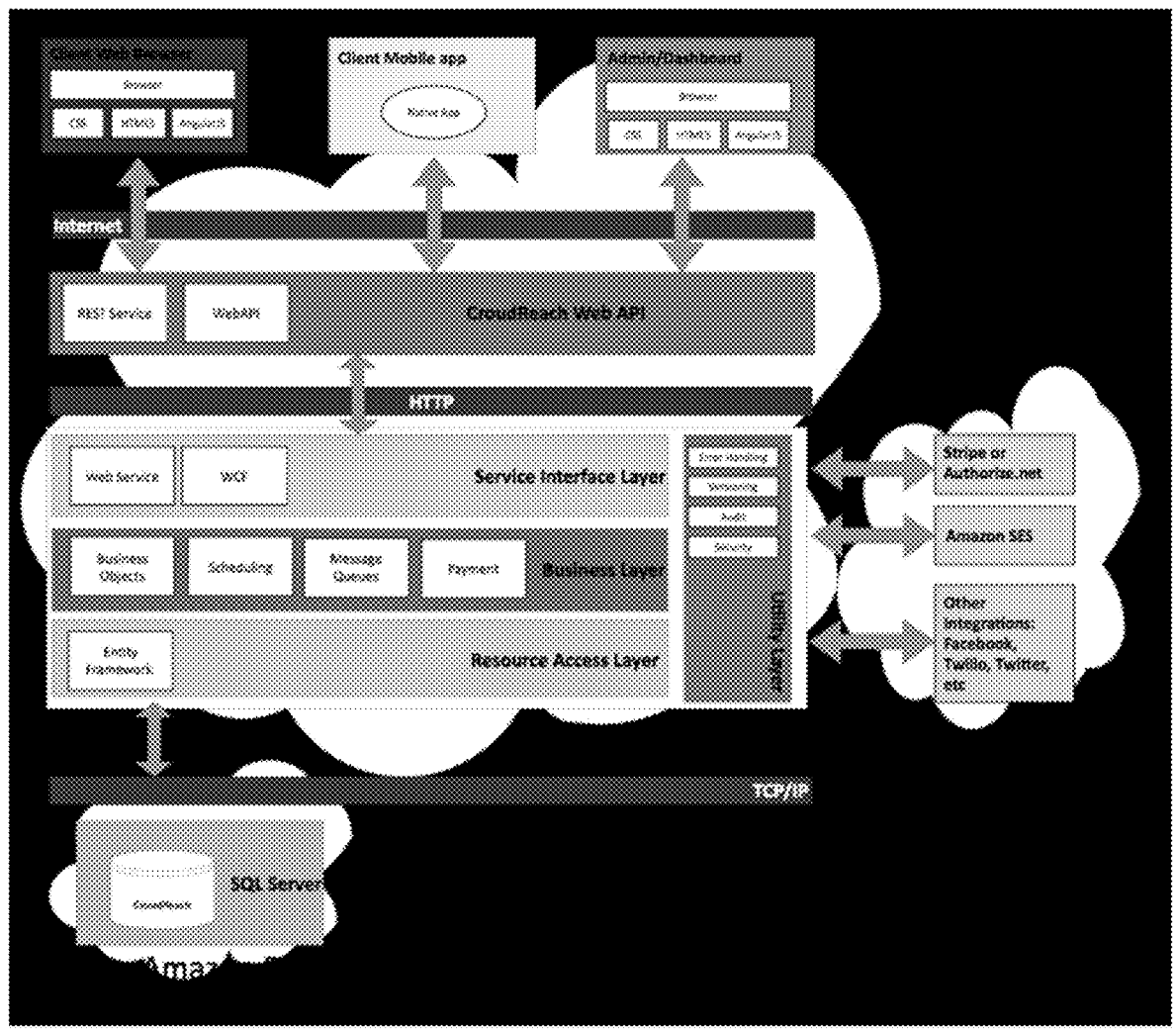
FIG. 6 depicts a block diagram of an example system architecture implemented via the Amazon web hosting service in accordance with embodiments of the present disclosure.

In accordance with embodiments, a system as disclosed herein may be implemented via any suitable cloud environment. As an example, such a system may be hosted by the Amazon AWS web hosting service available from Amazon Web Services, Inc. The system may scale to many front end web servers and use AWS queues and messaging service. Scaling may be done through setup in the cloud solution that can expand to additional servers each time the number of requests rise to a certain level or other metrics. The system can use simple email service (SES) and simple queue service to allow for rapid scale up for handling a large amount of messages. As an example, FIG. 6 depicts a block diagram of an example system architecture implemented via the Amazon web hosting service in accordance with embodiments of the present disclosure.

Figure 7:
FIG. 7 is a screen display of an example user interface for registering an account in accordance with embodiments of the present disclosure.

FIG. 7 illustrates a screen display of an example user interface for registering an account in accordance with embodiments of the present disclosure. The screen display includes various text boxes for entry of user name, contact information, login information, and account information.

Figure 8:
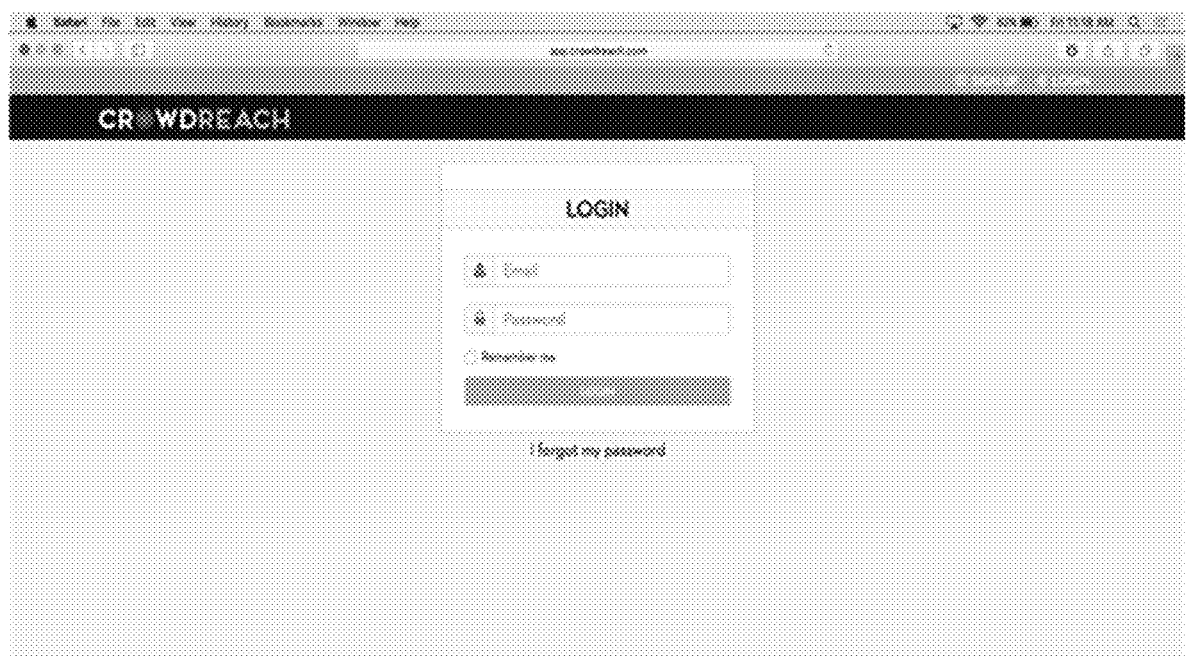
FIG. 8 is a screen display of an example user interface for logging into an account in accordance with embodiments of the present disclosure.

FIG. 8 illustrates a screen display of an example user interface for logging into an account in accordance with embodiments of the present disclosure. The screen display includes text boxes for entry of an email address and password for entry into the account.

Figure 9:
FIG. 9 illustrates a screen display of an example communication interface for communicating to contacts in accordance with embodiments of the present disclosure.

FIG. 9 illustrates a screen display of an example communication interface for communicating to contacts in accordance with embodiments of the present disclosure. The screen display includes a text box 900 for entry of a message title or subject for communication to multiple contacts via multiple, different modalities as described herein. Further, the screen display includes a text box 902 for entry of text for the body of the message. The screen display includes multiple buttons 904 that are each associated with a different contact group. Each contact group may be stored in memory along with identification of a particular modality (e.g., email, text messaging, or social network communication) for sending the message to each contact. An image may be included by use of button 906. The user may select one of the buttons 904 for "one click" sending of the message to the contacts associated with the selected button 904.

Figure 10:
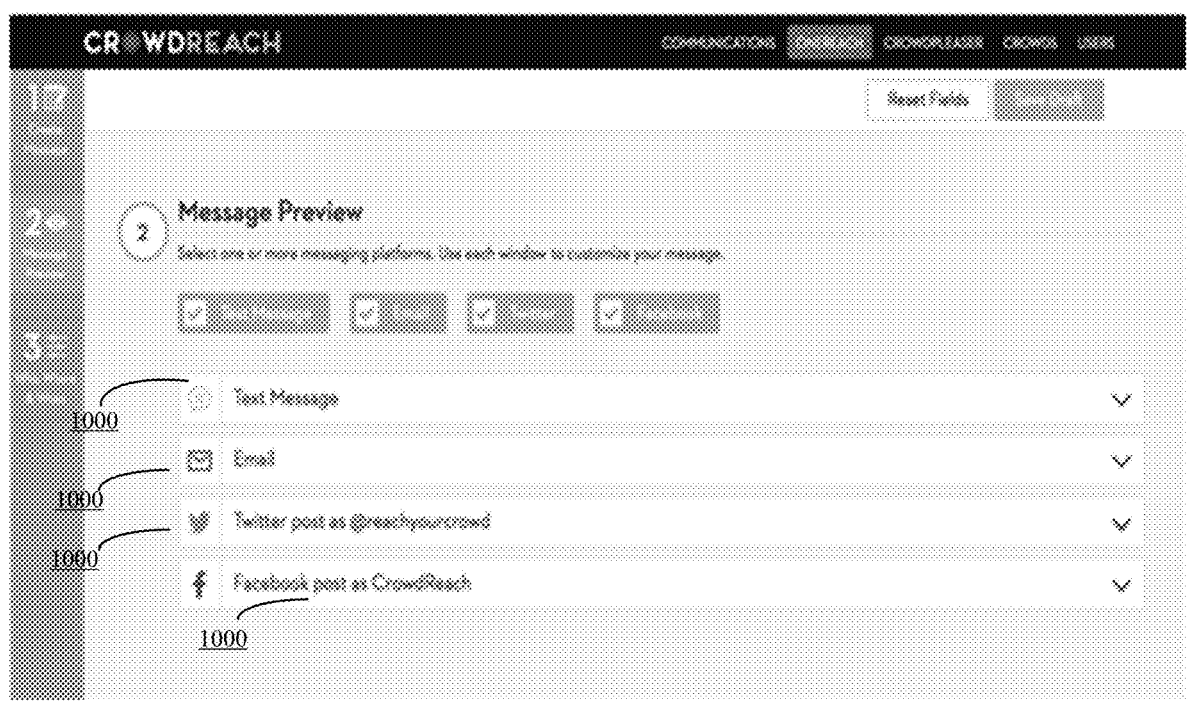
FIG. 10 illustrates a screen display of another example communication interface for communicating to contacts in accordance with embodiments of the present disclosure.

FIG. 10 illustrates a screen display of another example communication interface for communicating to contacts in accordance with embodiments of the present disclosure. The screen display includes various buttons 1000 that can be selected by the user to customize a message for the modality. The modalities in this example include text messaging, email, and two social network communication modalities.

Figure 11:
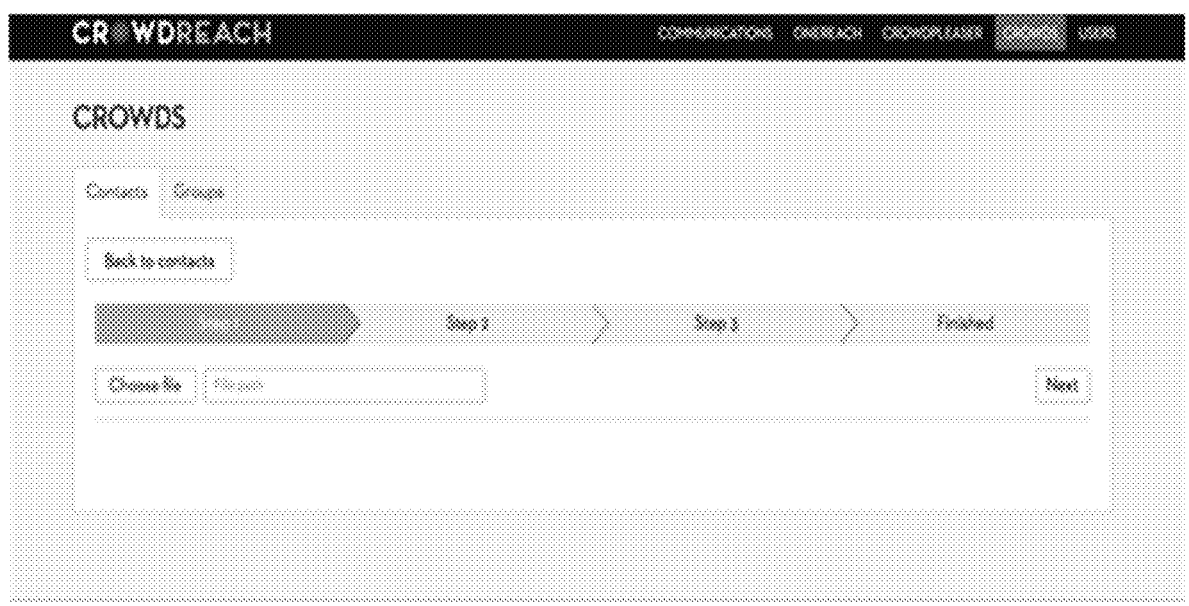
FIG. 11 illustrates a screen display of an example interface for importing contacts from CSV in accordance with embodiments of the present disclosure.

FIG. 11 illustrates a screen display of an example interface for importing contacts from CSV in accordance with embodiments of the present disclosure. The user can use this interface for selecting a CSV file to import.

Figure 12:
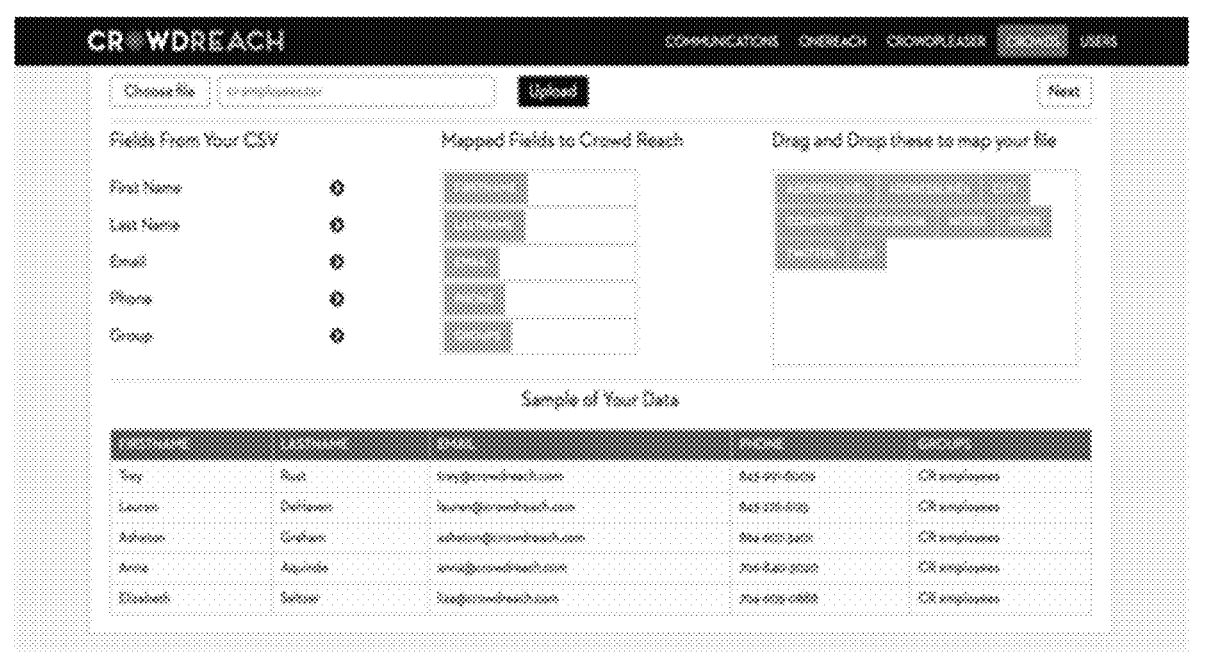

FIG. 12 illustrates a screen display of another example interface for importing contacts from CSV in accordance with embodiments of the present disclosure. This screen display shows example information presented subsequent to importing a CSV file. The information includes various contact name, email address, phone and contact group information.

Figure 13:
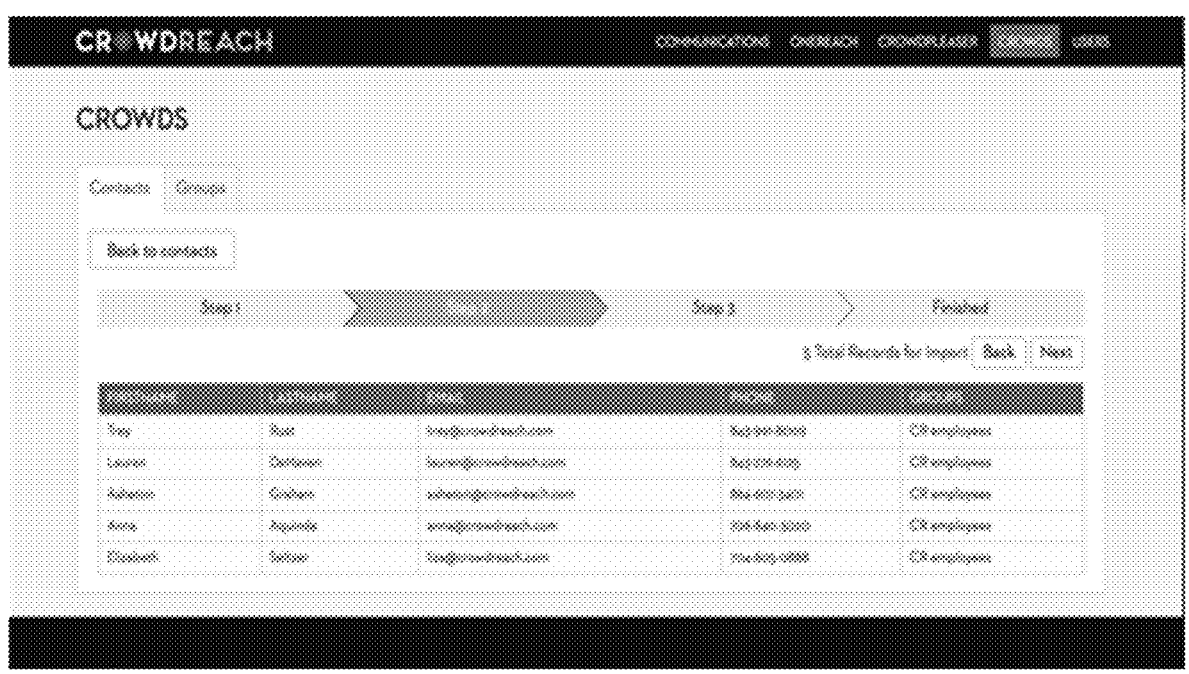
FIG. 13 illustrates a screen display of an example interface for reviewing imported contacts in accordance with embodiments of the present disclosure.

FIG. 13 illustrates a screen display of an example interface for reviewing imported contacts in accordance with embodiments of the present disclosure.

Figure 14:
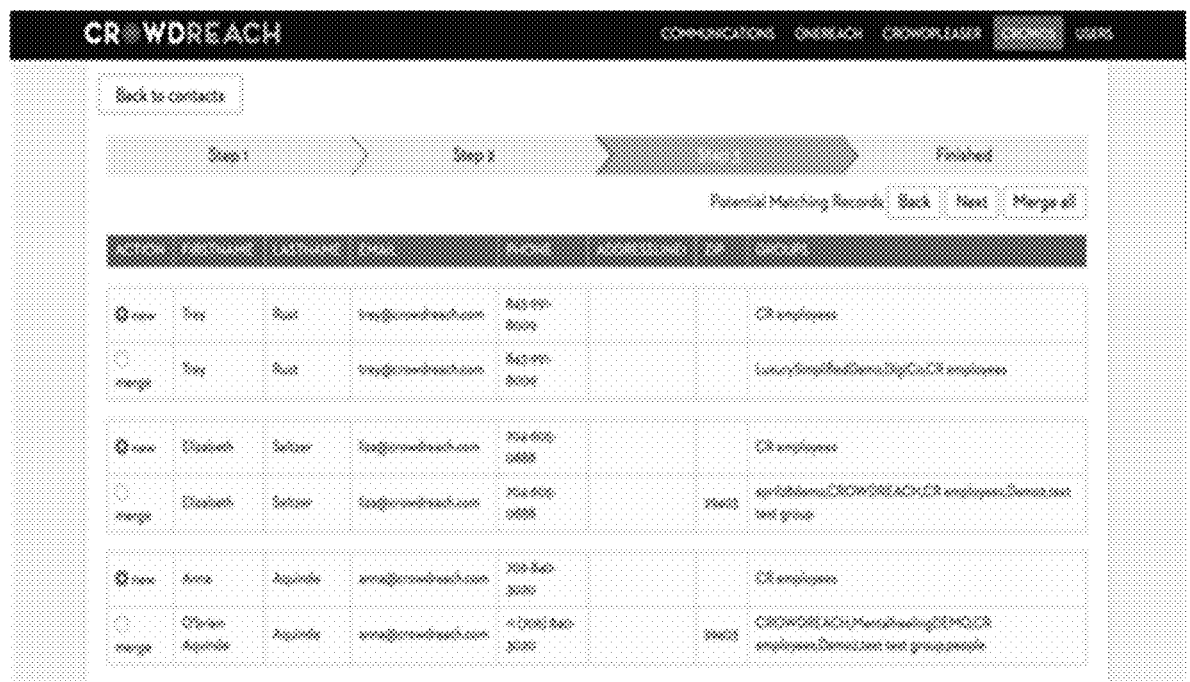
FIG. 14 illustrates a screen display of an example interface for merging imported contacts in accordance with embodiments of the present disclosure.

FIG. 14 illustrates a screen display of an example interface for merging imported contacts in accordance with embodiments of the present disclosure.

FIG. 15 illustrates a screen display of an example interface for setting communication preferences and for unsubscribing in accordance with embodiments of the present disclosure.

Figure 16:
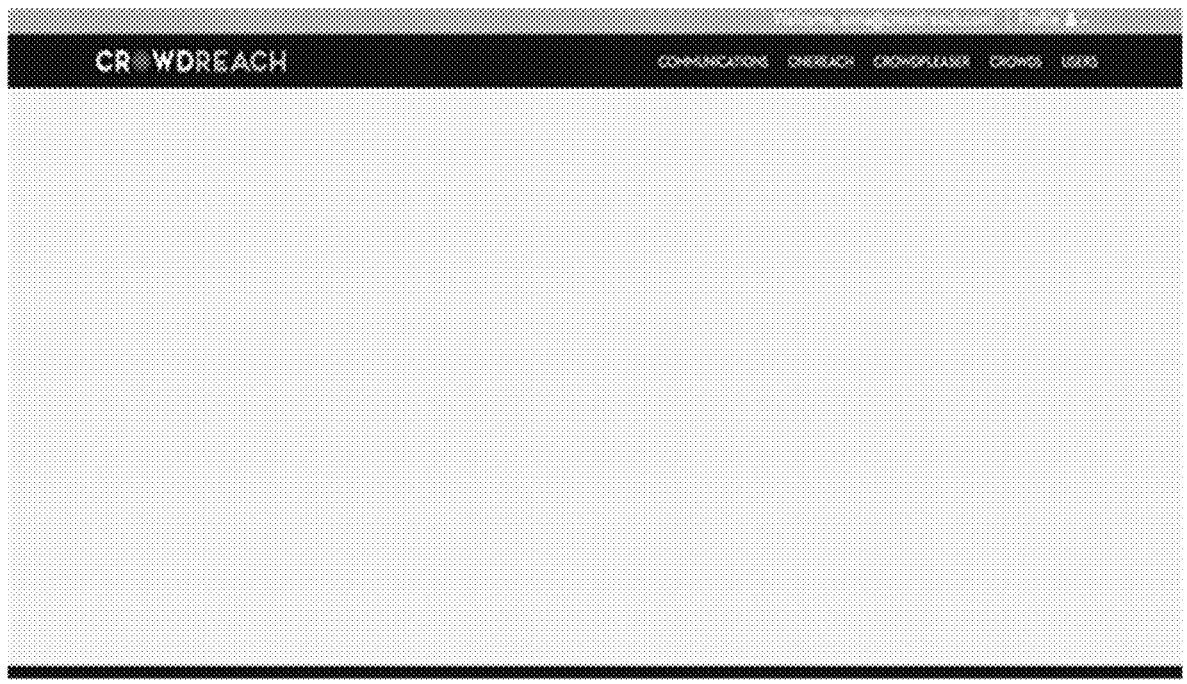
FIG. 16 illustrates a screen display of an example interface for a dashboard and landing page in accordance with embodiments of the present disclosure.

FIG. 16 illustrates a screen display of an example interface for a dashboard and landing page in accordance with embodiments of the present disclosure.

Figure 17:
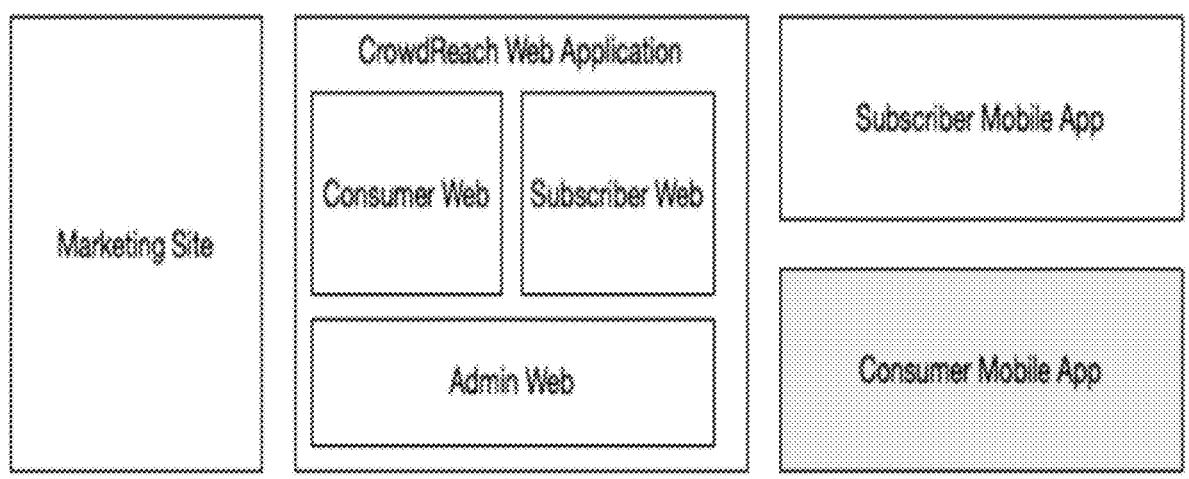
FIG. 17 illustrates a block diagram showing the relationship of an implemented marketing site, web application, subscriber mobile app, and consumer mobile app in accordance with embodiments of the present disclosure.

FIG. 17 illustrates a block diagram showing the relationship of an implemented marketing site, web application, subscriber mobile app, and consumer mobile app in accordance with embodiments of the present disclosure.

Figure 18:
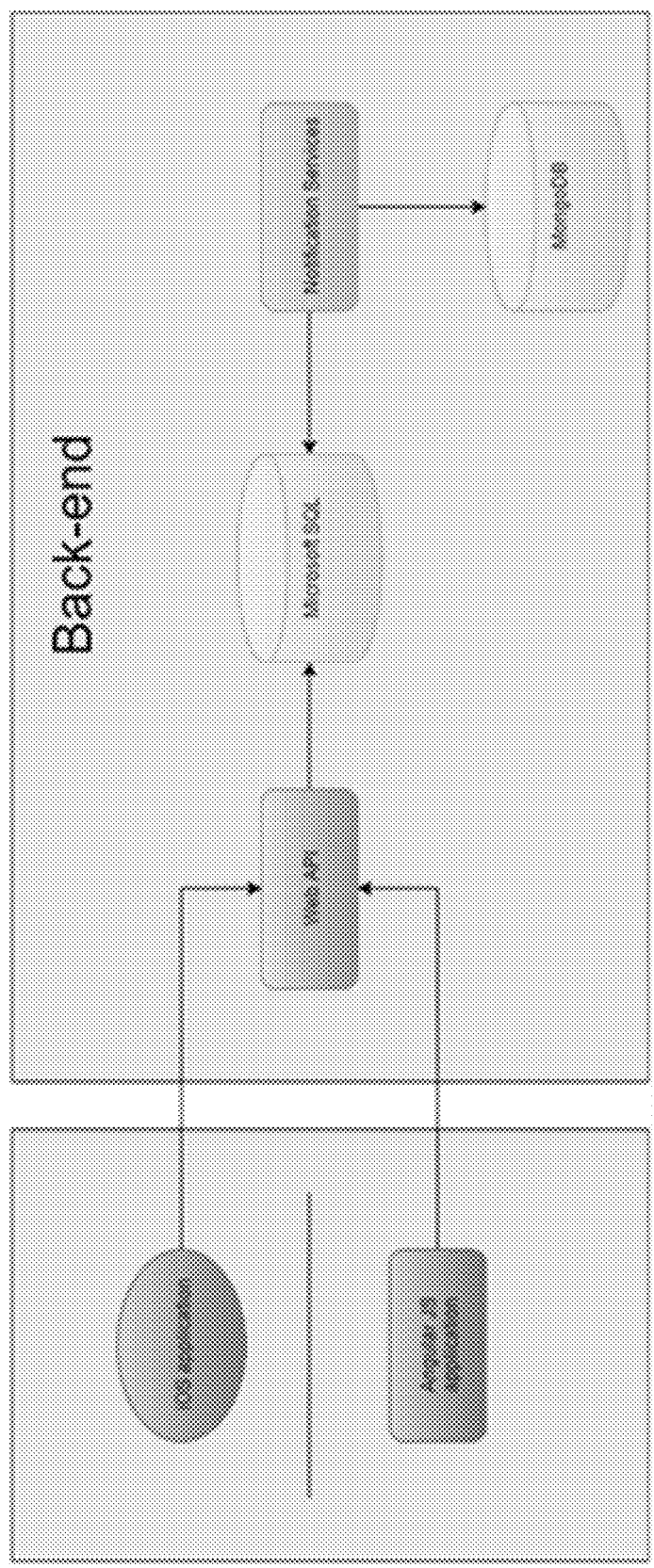
FIG. 18 illustrates a block diagram of an example architecture in accordance with embodiments of the present disclosure.

FIG. 18 illustrates a block diagram of an example architecture in accordance with embodiments of the present disclosure.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While certain embodiments have been described, these embodiments have been presented by way of example only, and are not intended to limit the scope of the inventions.

Indeed, the novel methods, devices, and systems described herein may be embodied in a variety of other forms. Furthermore, various omissions, substitutions, and changes in the form of the methods, devices, and systems described herein may be made without departing from the spirit of the inventions. The accompanying claims and their equivalents are intended to cover such forms or modifications as would fall within the scope and spirit of the inventions.

What is claimed:

1. A computing device comprising:
a user interface comprising a display configured to:
present a plurality of contacts for communication via a plurality of different communication modalities,
wherein the user interface is configured to receive user selection of a template and marketing content for communication via the plurality of different communication modalities; and
receive user selection of at least two of the contacts for communication; and a communications manager configured to:
initiate communication, based on a first user input, with the at least two of the contacts via at least two of the modalities in response to receipt of the user selection of the at least two of the contacts,
import, based on a second user input, a contact file having a predetermined set of individually separated fields;
select a plurality of fields from a second modality,
based on a third user input, graphically associate each of the selected plurality of fields from the second modality with each of the individually separated fields from the imported contact file;
generate a contact file having a mapped second set of contacts based on the associated plurality of fields from the second modality and the individually separated fields from the imported contact file;
import, from the second modality, the contact file having the mapped second set of contacts;
merge the mapped second set of contacts into the plurality of contacts for communication via the plurality of different communication modalities;
determine duplicate contacts among the mapped second set of contacts;
in response to determining duplicate contacts, remove the merged duplicate contacts;
communicate the template and marketing content to the at least two of the contacts via one of the modalities within the plurality of different communication modalities in response to receipt of the user selection of the at least two of the contacts.

2. The computing device of claim 1, wherein the user interface is configured to present the different modalities for selection as a preferred modality for communicating with the contact, and
wherein the communications manager is configured to initiate communication with each of the at least two of the contacts via the preferred communication modality for the contact in response to receipt of the user selection of the at least two of the contacts.

3. The computing device of claim 2, wherein the user interface is configured to display a single displayed component for interaction for selection of the at least two of the contacts for communication, and
wherein the communications manager is configured to initiate communication with the at least two of the contacts via the preferred modality of each of the at least two of the contacts in response to interaction with the single displayed component, wherein the preferred modality is email and text.

4. The computing device of claim 3, wherein the single displayed component is a displayed button.

5. The computing device of claim 1, wherein a communication modality comprises any one of, and, any combination of email, text messaging, and social network communication.

6. The computing device of claim 1, wherein the user interface and the communications manager are configured to:
present a web based interface for presentation of the contacts for a scheduled communication via the different communication modalities; and
receive user selection of the at least two of the contacts for communication, wherein the scheduled communication is available for sixty days.

7. The computing device of claim 6, wherein the web based interface is a dashboard.

8. The computing device of claim 1, wherein the user interface is configured to receive content for communication to each contact.

9. The computing device of claim 1, further comprising a communications manager configured to communicate an instruction to a second computing device to communicate content to the at least two of the contacts via the at least two of the modalities.

10. A method comprising:
at a computing device comprising a user interface comprising a display:
using the user interface to present a plurality of contacts for communication via a plurality of different communication modalities and receive user selection of a template and marketing content for communication via the plurality of different communication modalities;
initiating communication, based on a first user input, with the at least two of the contacts via at least two of the modalities in response to receipt of the user selection of the at least two of the contacts;
receiving user selection of at least two of the contacts for communication;
importing, based on a second user input, a contact file having a predetermined set of individually separated fields;
selecting a plurality of fields from a second modality,
based on a third user input, graphically associating each of the selected plurality of fields from the second modality with each of the individually separated fields from the imported contact file;
generating a contact file having a mapped second set of contacts based on the associated plurality of fields from the second modality and the individually separated fields from the imported contact file;
importing, from the second modality, the contact file having the mapped second set of contacts;
merging the mapped second set of contacts into the plurality of contacts for communication via the plurality of different communication modalities;
determining duplicate contacts among the mapped second set of contacts;
in response to determining duplicate contacts, remove the merged duplicate contacts;

in response to receipt of the user selection of the at least two of the contacts, initiating communication with the at least two of the contacts via at least two of the modalities;

communicating the template and marketing content to the at least two of the contacts via the plurality of different communication modalities in response to receipt of the user selection of the at least two of the contacts.

11. The method of claim 10, further comprising:

using the user interface to present the different modalities for selection as a preferred modality for communicating with the contact; and in response to receipt of the user selection of the at least two of the contacts, initiate communication with each of the at least one of the contacts via the preferred communication modality for the contact.

12. The method of claim 11, further comprising:

displaying, via the user interface, a single displayed component for interaction for selection of the at least two of the contacts for communication; and in response to interaction with the single displayed component, initiating communication with the at least one of the contacts via the preferred modality of each of the at least two of the contacts.

13. The method of claim 12, wherein the single displayed component is a displayed button.

14. The method of claim 10, wherein a communication modality comprises any one of email, text messaging, and social network communication.

15. The method of claim 10, further comprising:

presenting a web based interface for presentation of the contacts for communication via the different communication modalities; and receiving user selection of at least one contact within the at least two of the contacts for communication.

16. The method of claim 15, wherein the web based interface is a graphical interface.

17. The method of claim 15, further comprising receiving user selection of any one of a customized template and content for communication via each communication modality.

18. The method of claim 10, further comprising:

receiving content for communication to each contact; and in response to receipt of the user selection of at least one contact within the at least two of the contacts, communicating the content to the at least one of the contacts via the at least one of the modalities.

19. The method of claim 10, further comprising communicating an instruction to a second computing device to communicate content to the at least one of the contacts via the at least one of the modalities.

* * * * *